United States Patent [19]
Hara et al.

[11] Patent Number: 5,279,118
[45] Date of Patent: Jan. 18, 1994

[54] FLUID COUPLING

[75] Inventors: Takeshi Hara, Chiryu; Koji Maeda, Anjo; Kunio Morisawa, Toyota; Ryoji Habuchi, Miyoshi, all of Japan

[73] Assignee: Aisin Aw Co., Ltd., Japan

[21] Appl. No.: 893,422

[22] Filed: Jun. 8, 1992

[30] Foreign Application Priority Data

Jun. 7, 1991 [JP] Japan ................... 3-162498

[51] Int. Cl.$^5$ ............................................. F16D 33/00
[52] U.S. Cl. ........................................................ 60/365
[58] Field of Search ................................... 60/365, 366

[56] References Cited

U.S. PATENT DOCUMENTS 2,487,250 11/1949 La Brie .............................. 60/365
2,952,976 9/1960 Alexandrescu ...................... 60/366

FOREIGN PATENT DOCUMENTS 1-208238 8/1989 Japan .
2-159425 6/1990 Japan .

*Primary Examiner*—Edward K. Look
*Assistant Examiner*—F. Daniel Lopez
*Attorney, Agent, or Firm*—Lorusso & Loud

[57] ABSTRACT

Herein disclosed is a fluid coupling which comprises: a pump impeller connected to the output shaft of an engine; and a turbine runner for transferring a working fluid to and from the pump impeller. On the pump impeller and the turbine runner, respectively, there are arranged a pump blade and a turbine blade without any inner core for guiding the flow of the working fluid inside of the pump impeller and the turbine runner. By bending at least one of the working fluid outlet side of the pump blade and the working fluid inlet side of the turbine blade, there is formed transfer limit means for limiting the transfer of the working fluid when the fluid coupling is in a stalling state.

6 Claims, 4 Drawing Sheets

FLUID COUPLING

BACKGROUND OF THE INVENTION

1. Field of the Invention

The present invention relates to a fluid coupling and, more particularly, to a fluid coupling having no inner core and suited for use with a continuously variable transmission.

2. Description of the Prior Art

A fluid coupling (hereinafter referred to as "coupling") operates to transfer power through a working fluid between a pump impeller and a turbine runner, which are opposed to each other. The coupling does not function to increase input torque, and is different from a torque converter in this regard; rather, a coupling simply functions as a power transmitting junction. Since a coupling can be made smaller and lighter that a torque converter, due to absence of a stator, it is well suited for use as a coupler in a vehicle having a V-belt type continuously variable transmission (referred to hereinafter as "CVT").

Couplings of two types are known. One type of coupling is equipped with an inner core for guiding the flow of a working fluid therein and the other type is not equipped with such an inner core. The coupling of the type having no inner core offers the advantage of low weight, although its fluid passage varies in accordance with slippage between the pump and the turbine. In not having a fixed flow passage, it differs from the type of coupling having an inner core, and flow analysis for such a coupling is difficult, as is designing for predictable performance. An "inner core" is shown, for example, as member 8 in U.S. Pat. No. 5,005,356 issued to Saunders and as elements 10b in U.S. Pat. No. 4,866,935 issued to Hayabuchi et. al.

If a coupling without an inner core is to be used in an automobile to exploit its advantages, in order to improve the starting acceleration of a vehicle having a torque converter, especially a CVT, the engine r.p.m. at the start is desirably raised to increase torque, by reducing the capacity coefficient of the coupling at stalling (at a velocity ratio of 0) time. On the other hand, the capacity coefficient in an intermediate velocity ratio range has to be high to provide good mileage in steady running, good passing acceleration and good responsiveness.

The conventional approach to adjusting the capacity coefficient in a coupling having no inner core is by changing the blade angle. If the capacity coefficient at stalling is decreased in such a manner, the capacity coefficient in the intermediate velocity ratio range decreases with an increase in the velocity ratio, but the maximum capacity coefficient range is not in the intermediate velocity ratio range. In short, the characteristics cannot be finely adjusted by changing the blade angle although the capacity coefficient can be changed.

It is known in the prior art to provide a baffle plate for setting the capacity coefficient to a low value at stalling, while suppressing reduction in the capacity coefficient in the intermediate velocity ratio range. With a baffle plate, the flow of the working fluid in the coupling is blocked over a range extending from the time of stalling to the low velocity ratio and is offset from the blocked path in an intermediate or higher range so that the blocking action may be reduced or eliminated.

However, in attaching a baffle plate to the blade, the number of parts, the weight and the production cost are increased accordingly. This prior art approach also creates a problem in that the baffle board is difficult to fix, thereby endangering the reliability of the structure.

SUMMARY OF THE INVENTION

In view of the background thus far described, one objective of the present invention is to provide a fluid coupling, without an inner core, which gives improved performance without an increase in the number of parts. Another object of the present invention is to provide a fluid coupling having a sufficiently small capacity coefficient at the time of stalling with minimal reduction of the capacity coefficient at an intermediate velocity ratio.

Accordingly, the present invention provides a fluid coupling including a pump impeller connected to the output shaft of an engine and a turbine runner. A pump blade and a turbine blade are provided on the pump impeller and turbine runner, respectively. The fluid coupling of the present invention has no inner core for guiding the flow of said working fluid inside of the pump impeller and turbine runner. The coupling of the present invention is provided with transfer limit means formed by bending either the working fluid outlet side of the pump blade or the working fluid inlet side of the turbine blade, for limiting the transfer of working fluid from pump to turbine when the fluid coupling is in a stalling state.

In the coupling thus constructed according to the present invention, the transfer limit means formed in the pump blade and/or the turbine blade is disposed in the passage of the working fluid in the stalling range, i.e., in the vicinity of the average streamline, to limit the transfer of the working fluid so that it acts to reduce the capacity coefficient in the stalling range. However, in the intermediate velocity ratio range, some inertia force is established in the flow of the working fluid so that the action of the transfer limit means, limiting the transfer of the working fluid, is reduced and, accordingly, the reduction in the capacity coefficient in the intermediate velocity ratio range is less than in the stalling range.

According to the present invention, therefore, the capacity coefficient can be reduced at stalling to a sufficiently low level, without provision of an inner core, and with minimal reduction in the capacity coefficient in the intermediate velocity ratio range. Moreover, the structure of this novel coupling simplifies the machining required in its production and provides a reliable product with no increase in the number of parts, weight or cost.

An auxiliary advantage is that the acceleration of a vehicle having such a coupling can be improved while maintaining the mileage, passing acceleration and responsiveness.

DESCRIPTION OF THE PREFERRED EMBODIMENTS

One preferred embodiment of the present invention will be described with reference to the accompanying drawings.

Figure 1:
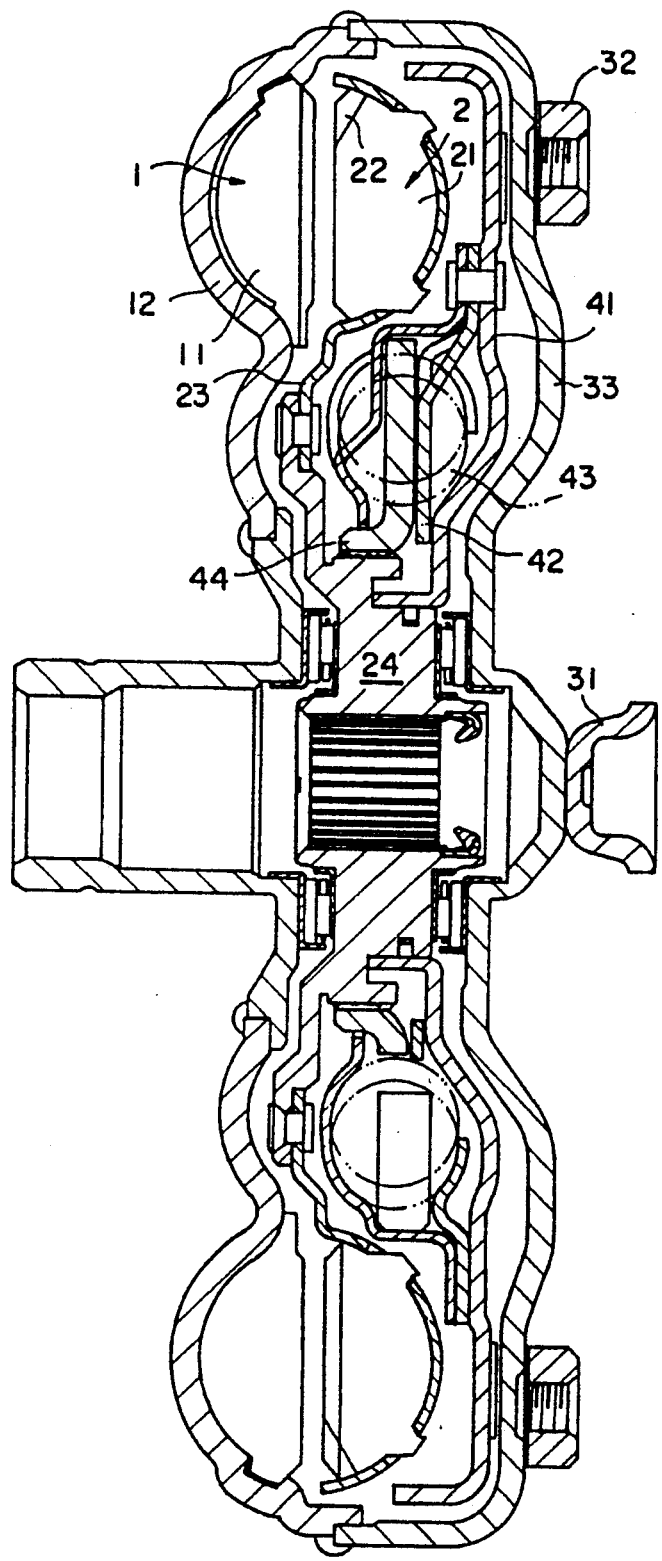
FIG. 1 is a sectional side elevation showing one embodiment of the coupling of the present invention.

FIG. 1 shows a coupling having a pump impeller 1 and a turbine runner 2 having a pump blade 11 and a turbine blade 21 arranged respectively thereon, without any inner core. In this embodiment, at the working fluid inlet side of the turbine blade 21, a transfer limit means 22, which is disposed in the passage of the working fluid in the stalling range to limit the transfer of the working fluid, is formed by bending the blade 21.

More specifically, the coupling shown in FIG. 1 is designed to be combined with a CVT (i.e., continuously variable transmission). The coupling includes a coupling cover 33 having a boss 31 engaged by and in alignment with the engine and attached to the drive plate of the engine through a spacer 32. A pump shell 12 is integrally welded to the coupling cover 33. A turbine hub 24 is splined to the input shaft of the CVT and has a turbine shell 23 riveted thereto. A lockup clutch piston 41 is supported axially and slidably on the turbine hub 24 and has a drive plate 42 riveted thereto. A driven plate 44 is splined to the turbine hub 24 and, together with the drive plate 42, supports a damper spring 43.

Figure 2:
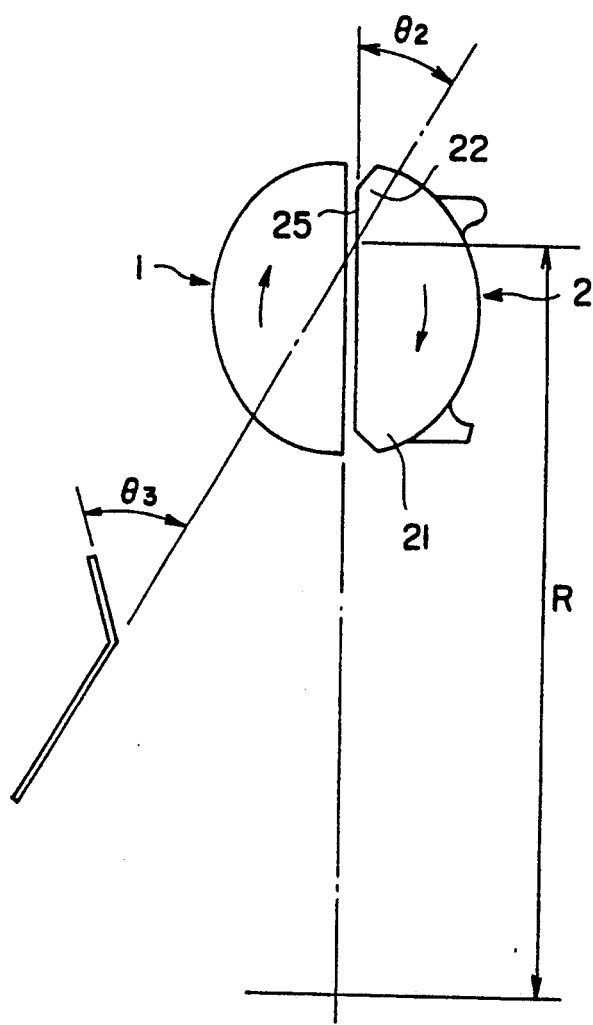
FIG. 2 is a side elevation showing the shape of a blade portion.
Figure 3:
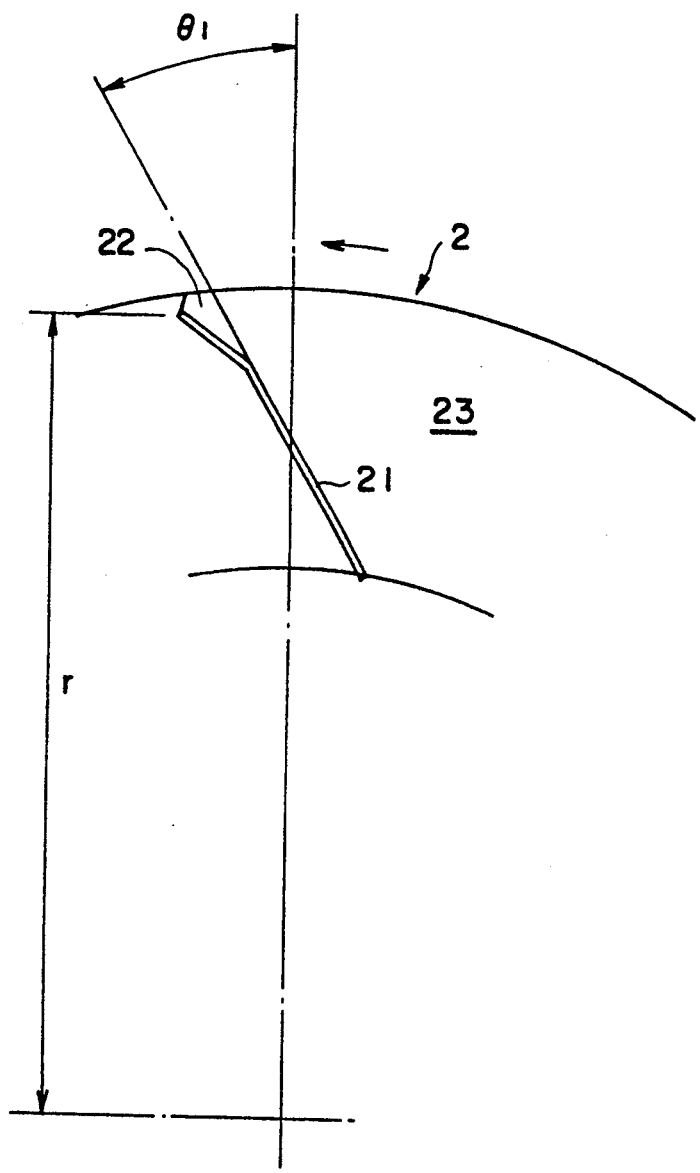
FIG. 3 is a sectional front elevation showing the shape of a turbine blade.

As shown in FIG. 3, each turbine blade 21 is attached to the turbine shell 23 such that the major portion of its length is inclined at a predetermined angle $\theta_1$, with respect to a radius of turbine shell 23 bisecting same (e.g., 30 degrees in the illustrated embodiment), in the direction of rotation of the turbine runner 2, as indicated by arrow in FIG. 3, i.e., with respect to a line normal to the turbine runner 2 and bisecting blade 21. At the outer circumference of the turbine blade 21, which opposes the outer circumference of the pump blade 11, there is provided a transfer limit means 22 which is partially bent with respect to the plane defined by the blade 21 that it starts from the position of a radius R, as shown in FIG. 2, and has its radially outerpoint located generally at the position of a radius r, as shown in FIG. 3. In this embodiment, the bending base line is inclined at an angle $\theta_2$, (e.g., 30 degrees in the illustrated embodiment) with respect to the front edge 25 of the turbine blade 21, and the bent portion is inclined at a predetermined angle $\theta_3$ (e.g., 30 degrees in the shown embodiment) with respect to the plane of the blade 21.

In the coupling thus constructed, the working fluid discharged from the pump impeller 1 flows in stalling state (where the velocity ratio is 0) through the central portion of the transfer limit means 22, as indicated by the radius r in FIG. 3, so that the transfer limit means 22 formed in the turbine blade 21 is positioned in the passage of the working fluid, i.e., in the vicinity of the average streamline in the stalling state. As a result, the transfer of the working fluid is limited to reduce the capacity coefficient in the stalling state. Moreover, this transfer limiting action is decreased as the inertia force is established in the flow of the working fluid as a result of the rise in the velocity ratio, i.e., the reduction in relative velocity difference between the pump impeller 1 and the turbine runner 2. Thus, it is possible to suppress the reduction in the capacity coefficient in the intermediate velocity ratio range.

Figure 4:
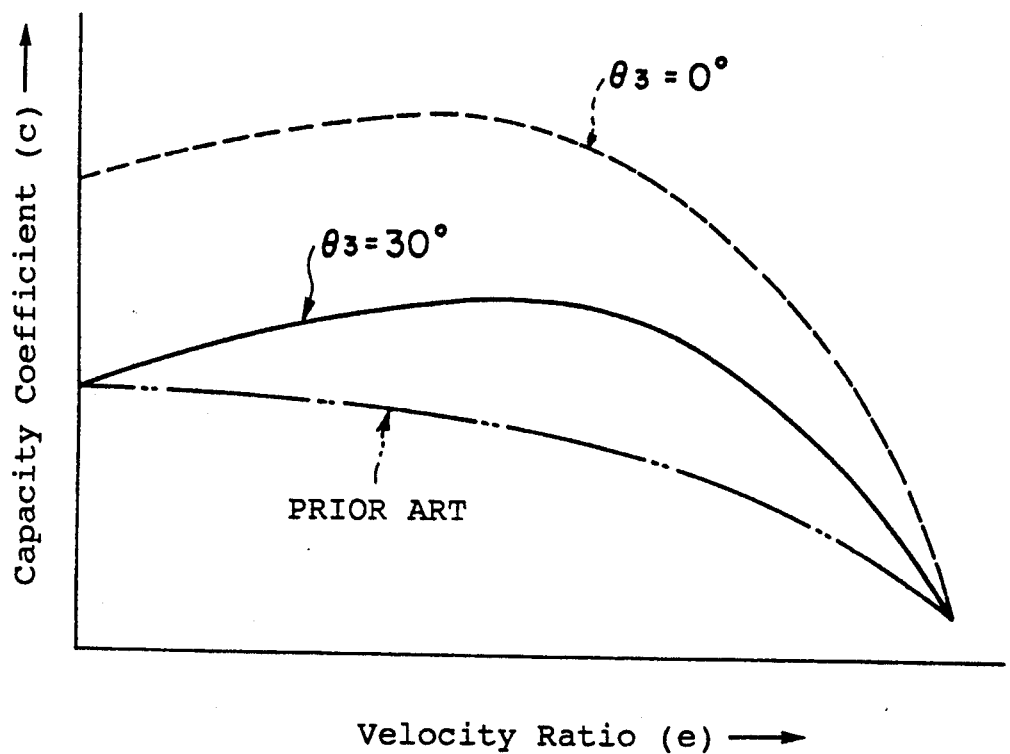
FIG. 4 is a graph plotting the changes of the capacity coefficient against the velocity ratio.

FIG. 4 presents graphs plotting the change in the capacity coefficient (c) against the velocity ratio (e). A dotted line indicates a fundamental characteristic curve of $\theta_3=0$ degrees before the adjustment, i.e., without the transfer limit means 22. A solid line indicates a characteristic curve of $\theta_3=30$ degrees with provision for the transfer limit means 22. A double-dotted line indicates a characteristic curve of the corresponding case having a blade angle $\theta_1$. In case the capacity coefficient (c) at the velocity ratio 0 is set to an equal value, as is apparent from the graphs, the capacity coefficient (c) will decrease with an increase in the velocity ratio (e) with blade angle $\theta_1$. In contrast, where a transfer limit means 22 is provided, the characteristics are such that the maximum capacity coefficient range is present in the intermediate velocity ratio range as in the fundamental characteristic curve corresponding to the case in which the transfer limit means 22 is not provided.

Accordingly, with the coupling of the embodiment described above, a CVT equipped vehicle can have improved mileage, passing acceleration and the responsiveness.

The present invention has been illustrated above by an embodiment described in detail, in which the arrangement and shape of the transfer limit means are defined according to the starting position of the bending base line, the angle of inclination with respect to the front edge of the blade, and the bending angle with respect to the plane containing the blade. Despite the detail of the foregoing description, however, the arrangement and shape of the transfer limit means can be modified in various respects without departure from the scope of the appended claims so long as the intended function of the transfer limit means is retained.

What is claimed is:

1. A fluid coupling for torque transfer from an engine output shaft, said fluid coupling having no interior fluid flow guide and comprising:
   a pump impeller having at least one pump blade and connected to the engine output shaft of an engine for rotation in one direction;
   a turbine runner, having at least one turbine blade defining a first plane, for transferring a working guide to and from said pump impeller, said turbine blade and said pump blade having inner edge portions in a facing relationship extending from a radially innermost end to a radially outermost end; and
   transfer limit means, in the form of a flat bent portion on the inner edge portion of said turbine blade, for limiting the transfer of said working fluid when said fluid coupling is in a stalling state, said flat bent portion being angled away from said first plane of said turbine blade in the direction of rotation.

2. A fluid coupling according to claim 1, wherein said turbine blade is inclined with its radially outermost end ahead of its radially innermost end in the direction of rotation.

3. A fluid coupling according to claim 1, wherein said transfer limit means is formed at the radially outermost end of said turbine blade.

4. A fluid coupling according to claim 3, wherein said bent portion lies flat in a second plane at approximately 30 degrees, in the direction of rotation, relative to said first plane in which the remainder of said turbine blade lies.

5. A fluid coupling according to claim 3, wherein said turbine blade is inclined with its radially outermost end ahead of its radially innermost end in the direction of rotation.

6. A fluid coupling according to claim 1, wherein said bent portion lies flat in a second plane at approximately 30 degrees, in the direction of rotation, relative to said first plane in which the remainder of said turbine blade lies.

* * * * *

UNITED STATES PATENT AND TRADEMARK OFFICE
CERTIFICATE OF CORRECTION

PATENT NO. : 5,279,118
DATED : January 18, 1994
INVENTOR(S) : HARA et al

It is certified that error appears in the above-indentified patent and that said Letters Patent is hereby corrected as shown below:

Col. 3, line 40, delete "outerpoint" insert --outer point--.

Col. 4, line 38, delete "guide" and insert --fluid--.

Signed and Sealed this

Twenty-third Day of August, 1994

Attest:

BRUCE LEHMAN

Attesting Officer     Commissioner of Patents and Trademarks